(12) United States Patent
Schreiner

(10) Patent No.: US 11,241,831 B2
(45) Date of Patent: Feb. 8, 2022

(54) DEVICE FOR THE ADDITIVE MANUFACTURING OF A SHAPED BODY

(71) Applicant: Konrad Schreiner, Vienna (AT)

(72) Inventor: Konrad Schreiner, Vienna (AT)

(*) Notice: Subject to any disclaimer, the term of this patent is extended or adjusted under 35 U.S.C. 154(b) by 216 days.

(21) Appl. No.: 16/464,342

(22) PCT Filed: Nov. 29, 2017

(86) PCT No.: PCT/AT2017/000079
§ 371 (c)(1),
(2) Date: May 28, 2019

(87) PCT Pub. No.: WO2018/098511
PCT Pub. Date: Jun. 7, 2018

(65) Prior Publication Data
US 2021/0114299 A1 Apr. 22, 2021

(30) Foreign Application Priority Data
Nov. 29, 2016 (AT) .................................. A 542/2016

(51) Int. Cl.
*B29C 64/259* (2017.01)
*B29C 64/321* (2017.01)
(Continued)

(52) U.S. Cl.
CPC .......... *B29C 64/259* (2017.08); *B29C 64/118* (2017.08); *B29C 64/209* (2017.08);
(Continued)

(58) Field of Classification Search
CPC ... B29C 64/259; B29C 64/321; B29C 64/118; B29C 64/209; B29C 64/205; B29C 64/106
See application file for complete search history.

(56) References Cited

U.S. PATENT DOCUMENTS

| 2001/0030383 A1 | 10/2001 | Swanson et al. |
| 2015/0140147 A1 | 5/2015 | Konstantinos et al. |

(Continued)

FOREIGN PATENT DOCUMENTS

| CN | 104129079 A | 11/2014 |
| JP | 2015-112871 A | 6/2015 |

(Continued)

OTHER PUBLICATIONS

International Search Report dated Mar. 13, 2018 issued in corresponding International Application No. PCT/AT2017/000079 with English translation.

*Primary Examiner* — Joseph S Del Sole
*Assistant Examiner* — Mohamed K Ahmed Ali
(74) *Attorney, Agent, or Firm* — Pillsbury Winthrop Shaw Pittman, LLP

(57) ABSTRACT

In a device for the additive manufacturing of a shaped body, comprising a construction platform, at least one printing head for applying material layer by layer to the construction platform or the shaped body at least partially constructed on the construction platform, a positionable carrier for the at least one printing head, a positioning system for the carrier, a holder for a material stock, and a supply device for supplying material from the material stock to the at least one printing head, the holder for the material stock, the supply device and the printing head are arranged in a unit designed as an exchangeable insert.

14 Claims, 11 Drawing Sheets

(51) Int. Cl.
*B29C 64/118* (2017.01)
*B29C 64/209* (2017.01)
*B33Y 30/00* (2015.01)
*B33Y 40/00* (2020.01)

(52) U.S. Cl.
CPC ............ *B29C 64/321* (2017.08); *B33Y 30/00* (2014.12); *B33Y 40/00* (2014.12)

(56) References Cited

U.S. PATENT DOCUMENTS

| | | | |
|---|---|---|---|
| 2015/0331412 A1* | 11/2015 | Adair | B29C 64/106 700/126 |
| 2016/0121546 A1 | 5/2016 | Yao et al. | |
| 2016/0136893 A1 | 5/2016 | Chang et al. | |
| 2017/0190108 A1* | 7/2017 | Holland | B29C 64/118 |
| 2017/0266876 A1* | 9/2017 | Hocker | B29C 64/106 |

FOREIGN PATENT DOCUMENTS

| | | | |
|---|---|---|---|
| JP | 2016-093991 A | 5/2016 | |
| KR | 10-2016-0107769 A | 9/2016 | |
| WO | 2006/020685 A2 | 2/2006 | |
| WO | 2015/175937 A1 | 11/2015 | |

* cited by examiner

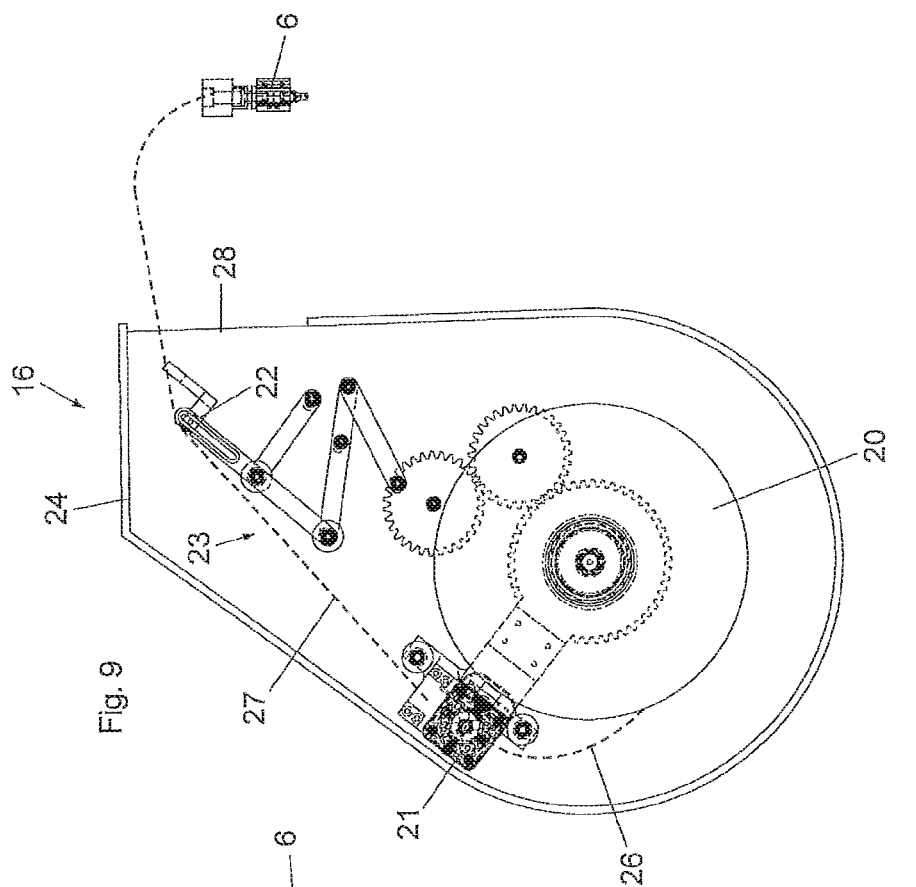
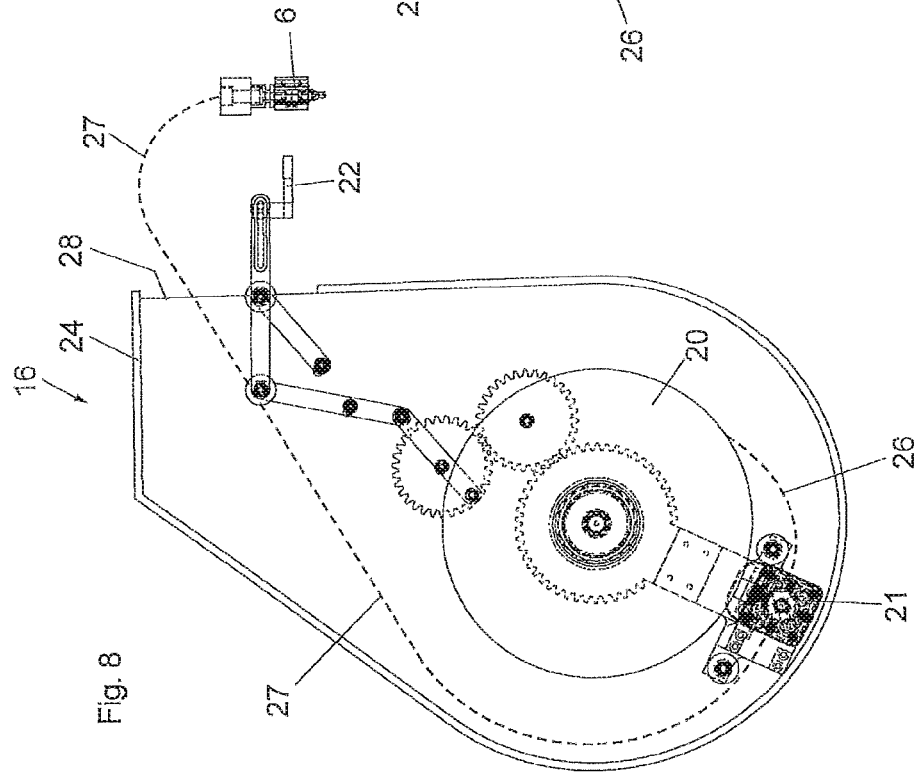

though offer enhanced simplicity at a material exchange. Moreover, by the provision of the supply device in the exchangeable insert, it can be ensured that the latter is optimally configured to the respective material, which supply device, for instance, comprises the components optimally coordinated with the respective material.

DEVICE FOR THE ADDITIVE MANUFACTURING OF A SHAPED BODY

CROSS-REFERENCE TO RELATED APPLICATIONS

This is the U.S. National Stage of PCT/AT2017/000079, filed Nov. 29, 2017, which claims priority to Austrian Patent Application No. A 542/2016 filed Nov. 29, 2016, and all contents of each of these applications are incorporated herein by reference in their entireties.

The invention relates to a device for the additive manufacturing of a shaped body, comprising a construction platform, at least one printing head for applying material layer by layer to the construction platform or the shaped body at least partially constructed on the construction platform, a positionable carrier for the at least one printing head, a positioning system for the carrier, a holder for a material stock, and a supply device for supplying material from the material stock to the at least one printing head.

Additive manufacturing methods, also referred to as 3D printing methods, are characterized by the layered construction of a shaped body. As a rule, a working plane is repeatedly traversed either line by line or at discrete points to site-selectively apply material, whereupon the working plane is moved upwards. Layer thicknesses range between 0.025 and 1.25 mm according to the use case. 3D printing methods are based on computer models of the object to be manufactured, which may, for instance, be generated by using CAD software. In doing so, a contour map of the object to be manufactured is prepared, in which a manufacturing grid is produced for each layer, said grid defining the grid cells where manufacturing material is to be site-selectively applied and solidified.

The invention preferably relates to a 3D printing method referred to as fused deposition modeling (FDM) or fused filament fabrication (FFF), in which a shaped body is built in layers from a meltable plastic. To this end, the liquefaction of a plastic or resin material (filament) usually fed in wire-form from a material stock is at first effected by heating, followed by the application of the liquefied material by extrusion through a nozzle and, finally, the solidification of the material by cooling on the desired location of the working plane. The extrusion of material can be performed continuously or intermittently. Where cantilevers, undercuts and apertures in the horizontal direction cannot be produced unsupported, a so-called support structure must be produced from a support material. The support material can likewise be applied via an extruder nozzle or a printing head, wherein the printing head is fed from a material stock differing from the material provided for the construction of the shaped body.

For the FDM process, forming resins and thermoplastics such as polyethylene, polypropylene, polyactide, ABS, PETG and thermoplastic elastomers can be currently used.

Conventional 3D printers, in particular those for performing an FDM process, comprise at least one manufacturing head or printing head and a construction platform, which are arranged so as to be displaceable relative to each other both along an operation direction in the plane of a layer and in the feed direction, based on the thicknesses of the layers.

The construction platform preferably is designed to be rigid or just height-adjustable, and the printing head, which in most cases is exchangeably received in a carrier, is positionable or movable with the aid of a positioning system, either two-dimensionally in a plane or three-dimensionally in space. The positioning system is either a Cartesian system or a so-called "delta" system. The Cartesian principle is modeled on portal milling machine, wherein the positioning of the carrier is performed by means of three driven linear axles spanning the three-dimensional construction space with the coordinate axes X, Y and Z. The delta printer utilizes the principle of parallelogram kinematics and can be programmed to make the carrier slightly pivotable. Three-dimensional positioning in this case is realized in the vertical direction by moving three driven axles spanning a triangle and holding the carrier.

With 3D printers operating according to the FDM method, differentiation is, furthermore, made between two basic material conveyance principles. With what is called direct drive, a feed device such as a conveying motor for the filament is positioned directly above the printing head (hot end). This enables the precise control of the material flow rate through the extruder nozzle of the printing head. By contrast, the feed device in a Bowden cable system is attached in a fixed position, e.g. the outer frame of the printer, rather than above the printing head. A Bowden cable in whose interior the filament is conducted connects the feed device to the printing head.

Shaped bodies frequently have to be constructed of more than one material. A material change during the construction process is, for instance, required for forming a shaped body in several colors or of regions having different material properties. For a material change, the manufacturing process in conventional 3D printers has to be interrupted to exchange the material stock. Since the printing head, and optionally also the material supply device, in most cases have to be adapted to the respective material, it is also necessary in the course of a material change to perform adaptations of the printing head or even exchange the printing head. If required, also the supply device has to be converted or exchanged. Such conversions are not only time-consuming, but also require the presence of a technically qualified operator. A fully automatic operation is not possible.

The present invention, therefore, aims to further develop a 3D printer to the effect that the exchange of the printing head and/or the material will be simplified.

To solve this object, the invention in a device of the initially defined kind substantially provides that the holder for the material stock, the supply device and the printing head are arranged in a unit designed as an exchangeable insert. The exchangeable insert allows all three mentioned components, i.e. the holder for the material stock, optionally plus the material stock stored therein, the supply device and the printing head, to be made available to the 3D printer in a combined unit such that, at a material exchange, also an associated supply device and an associated printing head will simultaneously be provided. Preferably, the mentioned components are provided in the exchangeable insert ready for use, i.e. the material of the material stock, in particular a filament, is fed to the printing head via the supply device such that the printing head will be immediately ready for use after having been removed from the exchangeable insert and positioned in the carrier. As opposed to conventional configurations, in which the individual components such as the printing head or the material stock are separately exchangeable, the invention offers the advantage that a printing head will be immediately ready for use upon insertion of the exchangeable insert, whereas otherwise material would have to be supplied to an exchanged printing head first, which makes handling considerably more cumbersome.

The provision in a combined, exchangeable insert of all components coming into contact with the material, furthermore, offers the advantage that the respective printing head and the respective supply device are only used with the assigned material, thus rendering the cleaning of the printing head or the supply device superfluous at an exchange. By contrast, conventional systems require cleaning of a printing head before the latter can be used with a new material.

A preferred configuration provides that the device comprises at least one mounting or insertion place, preferably at least two mounting or insertion places, each for receiving an exchangeable insert. The provision of at least one mounting or insertion place enables the simple and rapid insertion of the exchangeable insert into the 3D printer. Analogously, the removal of the exchangeable insert is also possible in a simple manner. The mounting or insertion place is preferably located such that the exchangeable insert can be pushed in or inserted from the exterior of the device, i.e. opening of the construction space is not required therefor. If, as in correspondence with a preferred configuration, at least two mounting or insertion places are provided, two or more exchangeable inserts can be used at the same time, thus enabling the device to utilize a corresponding number of printing heads with the respectively associated supply device and material stock.

It is preferably provided that the exchangeable unit is open or openable to the construction space containing the construction platform and the positionable carrier. This will result in that the printing head made available together with the exchangeable unit will be directly graspable from the construction space after the insertion of the exchangeable unit in a mounting or insertion place.

For the purpose of easy handling, it is preferably further provided that the exchangeable insert comprises a housing enclosing the holder for the material stock, the supply device and the printing head. The exchangeable insert thus assumes the shape of a cartridge in which the printing head, the supply device and the holder for the material stock, or the material stock, are received in a protected manner.

To use for the manufacturing process the printing head initially disposed in the exchangeable insert, it is necessary to fix the printing head to the positionable carrier, or insert the same into a mount of the carrier. To this end, the exchangeable unit preferably comprises a retaining device for detachably holding the printing head.

In order to facilitate the transfer of the printing head from the exchangeable insert to the carrier, the printing head, optionally together with the retaining device, is preferably displaceable from a storage position arranged in the housing into a transfer position projecting from the housing into the construction space. In this case, the exchangeable unit may, in particular, comprise an extendable arm and/or swing-out arm, to which the printing head, optionally together with the retaining device, is attached, the printing head being displaceable on said arm from the storage position arranged in the housing into the transfer position projecting from the housing into the construction space. The extendible arm and/or swing-out arm preferably comprises a displacement or pivot drive, which is likewise arranged in the exchangeable insert.

According to a preferred configuration, the transfer of the printing head to the positionable carrier can be performed in an automatically controlled manner. It is, in particular, possible to provide a transfer device, in particular a manipulator, for transferring the printing head from the exchangeable unit into a position received in the carrier, and back. The manipulator can be disposed and fixed in the construction space of the device and thus form a fixed component of the 3D printer. Alternatively, the manipulator may be a component of the exchangeable insert and inserted into, and removed from, the 3D printer as part thereof.

In the context of a preferred configuration, the positioning system, along with the carrier positionable by the same, can be used as a manipulator. In doing so, the positioning system moves the carrier into a position in which the printing head can be taken over from its transfer position. To this end, the carrier, for instance, approaches the printing head located in the transfer position, e.g. from below, so that the latter is inserted into the provided printing head mount of the carrier.

The insertion and mounting of the printing head in the carrier, for instance, occurs via a self-centering system preferably operating based on the principle of the self-alignment of an iron part in the magnetic field of an electromagnet. Moreover, the printing head mount of the carrier may preferably be conically designed so as to enable the correct seizure of the printing head by the carrier even in the case of imprecise prepositioning.

In order to ensure the electric energy supply of the components disposed in the exchangeable insert, it may be provided that the exchangeable insert comprises an electric energy storage means such as a rechargeable accumulator. Alternatively, the exchangeable insert may comprise electrical contacts for connecting the insert to counter-contacts of the 3D printer, wherein the counter-contacts are connectable to an electric energy source such as grid voltage.

Bearing in mind the design of the supply device, a preferred configuration contemplates that the supply device comprises a feed unit for feeding material stored in strand form, in particular a filament. The supply device, in particular, comprises a Bowden cable connecting the material stock, in particular the feed unit, to the printing head. In such a configuration, the feed unit can remain in the exchangeable insert, the Bowden cable establishing a material-feeding connection between the feed unit and the printing head while allowing the free positionability of the printing head.

The supply device is preferably arranged such that the printing head, in the state connected to the supply device, is displaceable from the storage position arranged in the exchangeable unit into the transfer position projecting from the housing into the construction space and/or into the position received in the carrier.

Basically, the positioning system for the carrier and the at least one printing head attached thereto or received therein may be designed in any manner whatsoever. A preferred configuration in this context contemplates that the positioning system is built in the manner of a delta printer, thus comprising three vertical guides spanning a triangle in ground plan, along which one carriage is each arranged so as to be movable in the vertical direction. The carriages are each articulately connected to the carrier, e.g. by means of bars, wherein the carrier is supported in the interior of the straight prism with a triangular base defined by the guides. The individual carriages are independently movable in the vertical direction, wherein each carriage is preferably assigned a stepper motor and the stepper motors are actuatable independently of one another. An electronic control system ensures that the actuation of the stepper motors is performed such that the positions respectively required for the construction of the shaped body in the three-dimensional space will be approached one after the other.

The holder for the material stock, in the event of a material present in filament-form, may be comprised of a cylinder, a reel or a drum, about which the material is wound like a coil. This enables the space-saving storage of a large material length, on the one hand, and the continuous supply of the material, on the other hand.

The holder for the material stock may preferably be comprised of a container or disposed in a container, which is removably arranged in the exchangeable insert and includes a material duct for guiding the material stored in the container to the outside, in particular to the supply device arranged outside the container, in particular the feed device of the supply device. The container encloses the material or forms a material package, the container being introducible or insertable into the exchangeable insert and again removable therefrom in order to thereby enable a material change or an exchange of a used material holder for a holder with new material. The exchangeable insert preferably comprises an externally accessible container mounting or insertion place, which serves for mounting the container, wherein mounting and dismounting of the container are, in particular, also possible with the exchangeable insert in the mounting or insertion place of the device so as to enable the exchange of a container even during running operation.

The container may, for instance, receive a cylinder, a reel or a drum about which the material is wound like a coil.

In the event of moisture-sensitive or hygroscopic material, it is preferably provided that the container wall of the container is made of a water- and water-vapor-proof material, preferably a composite material comprising a cardboard layer and a polymer film.

According to a further aspect, the invention relates to a device for the additive manufacturing of a shaped body, comprising a construction platform, a positionable carrier for at least one material application and/or processing head such as a printing head, and a positioning system for the carrier, said device being characterized in that at least one mounting or insertion place for mounting an exchangeable unit is provided.

The exchangeable unit or insert can be introduced into the mounting or insertion place from the side or from top or from bottom.

It is preferably provided that the mounting or insertion place is open or openable to the construction space containing the construction platform and the positionable carrier.

Furthermore, a transfer device, in particular a manipulator, for transferring the material application and/or processing head from the exchangeable unit received in the at least one mounting or insertion place into a position received in the carrier, and back.

According to a further aspect, the invention relates to an exchangeable insert for receiving in a mounting or insertion place the device according to the invention, wherein the exchangeable insert comprises a material application and/or processing head, in particular a printing head, for applying material layer by layer to a construction platform or a shaped body at least partially constructed on the construction platform, and optionally a holder for a material stock, and optionally a supply device for supplying material from the material stock to the at least one material application and/or processing head. By material application and/or processing head, any manufacturing head enabling manufacturing steps in regard to the shaped body to be produced is understood. This may be a printing head, by which material for constructing the shaped body or support material for supporting the structure to be constructed is supplied, or a processing head which is, for instance, suitable for machining the shaped body. The processing head may, for instance, be designed as a milling head. The manufacturing head may also be designed as a pick-and-place unit and comprise a gripper device, by which material in lump form can be taken from a material stock and applied to the shaped body. Another option consists in the application of a material different from plastic, e.g. a metal filament or the like, via a correspondingly adapted manufacturing head in order to reinforce the shaped body.

The exchangeable insert can thus be used to equip a 3D printer with a number of additional functions.

As already pointed out in the connection with the 3D printer according to the invention, the exchangeable insert may have the following configurations.

It is preferably provided that the exchangeable insert, in the state received in the mounting or insertion place, is open or openable to the construction space containing the construction platform and the positionable carrier.

The exchangeable insert preferably comprises a housing enclosing the material application and/or processing head, and optionally the holder for a material stock, and optionally the supply device.

A further preferred configuration provides that the exchangeable insert comprises a retaining device for detachably holding the material application and/or processing head.

The material application and/or processing head, optionally together with the retaining device, are advantageously displaceable from a storage position arranged in the housing into a transfer position projecting from the housing. The exchangeable insert may, in particular, comprise an extendible arm and/or swing-out arm, to which the material application and/or processing head, optionally together with the retaining device, are attached, the material application and/or processing head being displaceable on said arm from the storage position arranged in the housing into the transfer position projecting from the housing.

The supply device may preferably comprise a feed unit for feeding a material stored in strand form, in particular a filament.

Furthermore, the supply device may preferably comprise a Bowden cable connecting the material stock, in particular the feed unit, to the printing head.

According to a preferred further development, the printing head, in the state connected to the supply device, is displaceable from the storage position arranged in the exchangeable unit into the transfer position projecting from the housing.

According to a further aspect, the invention relates to a set comprising
 a device for the additive manufacturing of a shaped body, comprising a construction platform, a positionable carrier for at least one material application and/or processing head such as a printing head, and a positioning system for the carrier, wherein at least one mounting or insertion place for mounting an exchangeable unit is provided, and
 at least a first exchangeable insert according to the invention comprising a printing head for applying material layer by layer to a construction platform or a shaped body at least partially constructed on the construction platform, a holder for a material stock, and a supply device for supplying material from the material holder to the printing head.

The set preferably comprises
 at least a second exchangeable insert comprising a material processing tool for machining a shaped body, such as a milling head or the like.

In the following, the invention will be explained in more detail by way of exemplary embodiments schematically illustrated in the drawing. Therein, FIG. 1 is an external view of a 3D printer according to the invention;

FIG. 8 is a view of the exchangeable insert with the printing head removed from the retaining device;

FIG. 9 is a view of the exchangeable insert with the printing head in a position of use;

Figure 1:
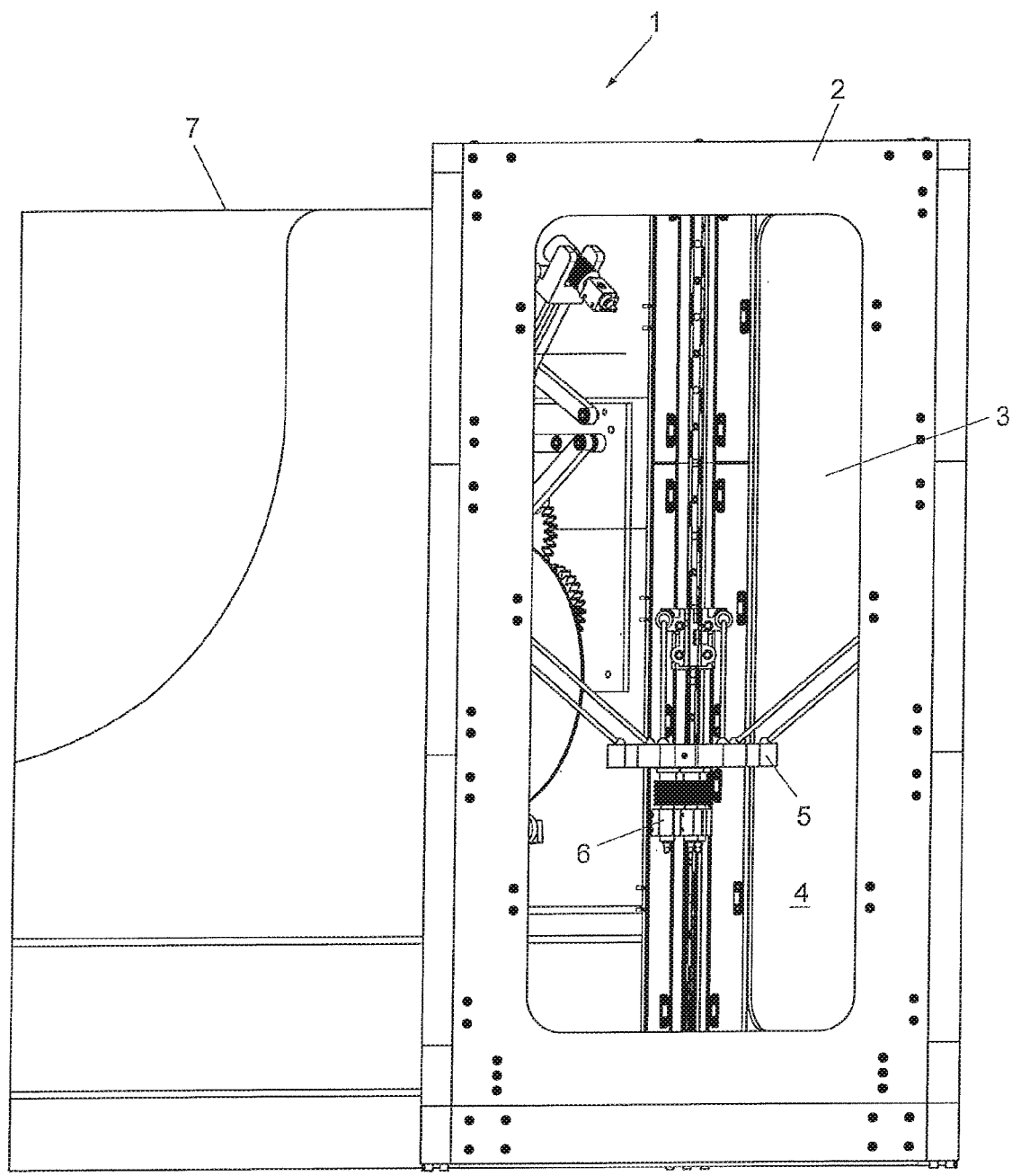

FIG. 1 illustrates a 3D printer. The 3D printer comprises a main housing 2, which is provided with an inspection window 3 on at least one of its side faces to give an insight into the construction space 4 of the 3D printer 1. In the construction space 4 of the 3D printer 1, a carrier 5 is held to be three-dimensionally positionable by a positioning system. The carrier 5 carries printing heads 6 configured to apply a manufacturing material.

The 3D printer 1 further comprises an add-on housing 7 laterally arranged at the main housing 2 and comprising at least one, preferably three, mounting or insertion places for exchangeable inserts.

Figure 2:
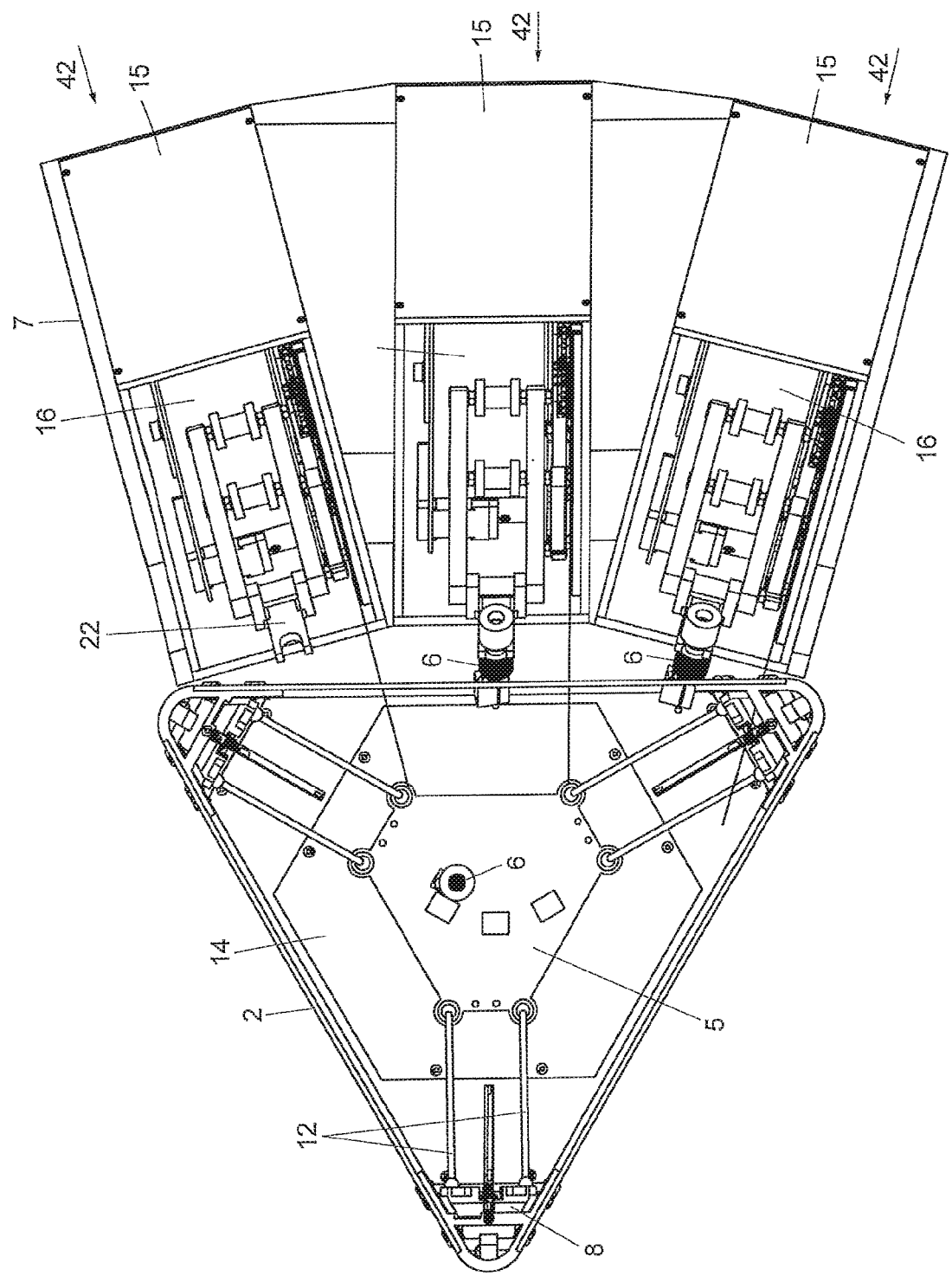
FIG. 2 is a ground plan of the 3D printer according to FIG. 1.

From the ground plan according to FIG. 2, it is apparent that the main housing 2 has a triangular ground plan, wherein the add-on housing 7 is arranged laterally of the main housing 2 and comprises three mounting or insertion places 15 for exchangeable inserts 16. The respective exchangeable insert 16 can be inserted or pushed into the respective mounting or insertion place 15 in the sense of arrow 42.

Figure 3:
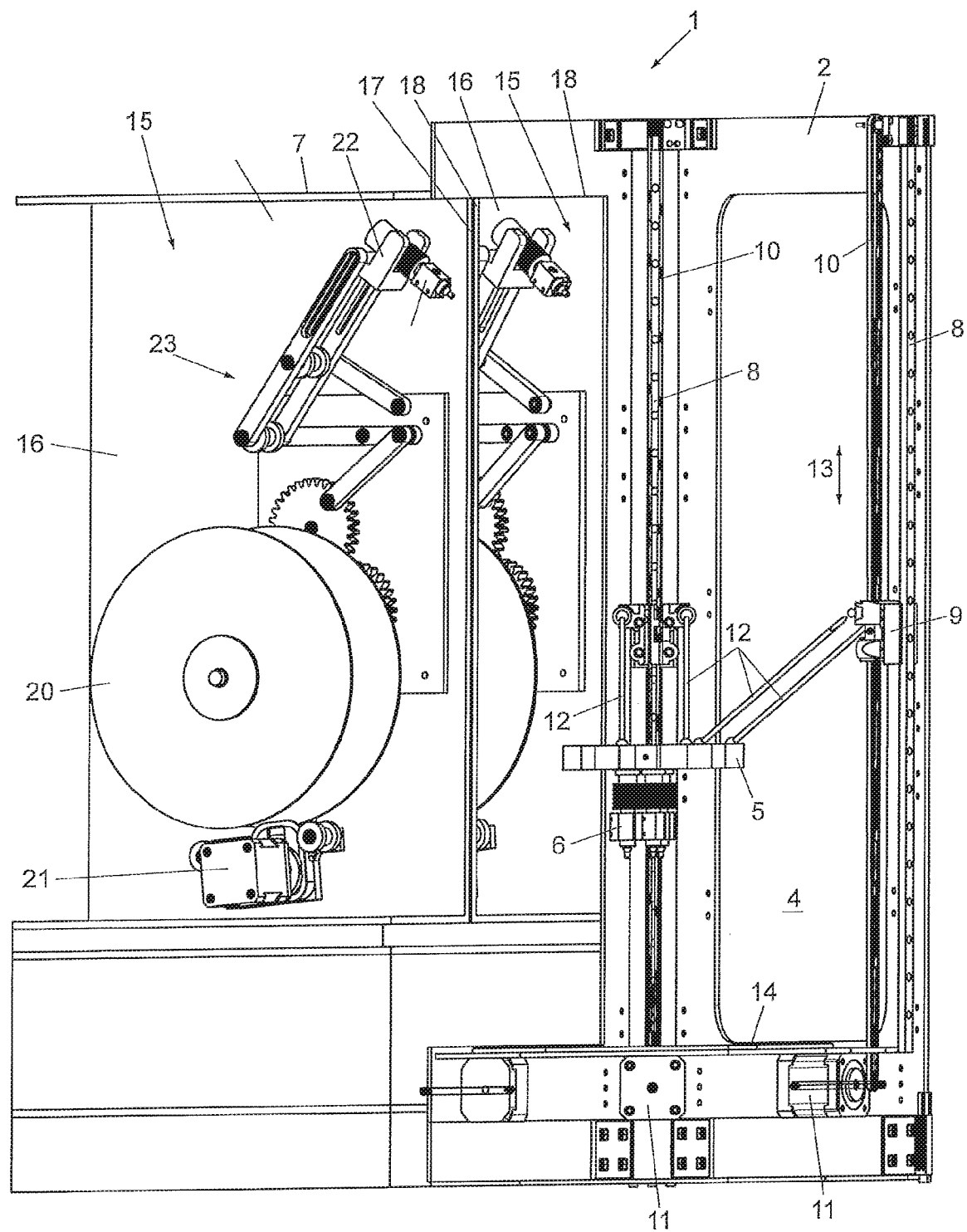
FIG. 3 depicts a first internal view of the 3D printer.

The internal view according to FIG. 3 illustrates the positioning system for the carrier 5 in more detail. The positioning system comprises three vertical guides, e.g. guide rods 8, two of which are shown in FIG. 3. A carriage 9 is each arranged on the guide rods 8 so as to be displaceable in the vertical direction, the displacement drive comprising a schematically indicated drive belt 10 each driven by a stepper motor 11. The carrier 5 is fastened to the carriage 9 by means of stay bars 12 articulately attached to both sides. The carriages 9 are independently movable in the sense of arrow 13, thus enabling the three-dimensional positioning of the carrier 5 in the construction space 4. Moreover, tilting of the carrier 5 is also enabled. In the interior of the construction space 4 is provided a construction platform 14, on which the shaped body to be formed is constructed layer by layer by applying material from the printing heads 6.

From FIG. 3 it is further apparent that the laterally attached add-on housing 7 comprises two insertion places 15 each receiving an exchangeable insert 16. The exchangeable inserts 16 are open towards the construction space 4 so as to enable the carrier 5 to be equipped with printing heads by the exchangeable inserts 16, as will be explained in more detail below. The exchangeable inserts 16 comprise a housing each, wherein a rear and a front housing wall 18 are visible with the exchangeable insert 16 disposed farther behind in FIG. 3. For the exchangeable insert 16 disposed farther forward in FIG. 3, only the rear housing wall 19 is shown. The front housing wall has not been entered for the sake of clarity to make the components received in the exchangeable insert 16 more clearly apparent. Between the housings of the exchangeable inserts 16 may optionally be provided a partition wall 17 separating the two insertion places 15.

The exchangeable inserts 16 each contain a material holder in the form of a material roller 20, which comprises a material in strand form (filament) wound up like a coil. The material roller 20 is assigned a feed device 21 arranged to draw the filament from the roller 20 and feed it to the printing head 6. The printing head 6 is held in a retaining device 22 fastened to an arm 23 comprised of several segments.

Figure 4:
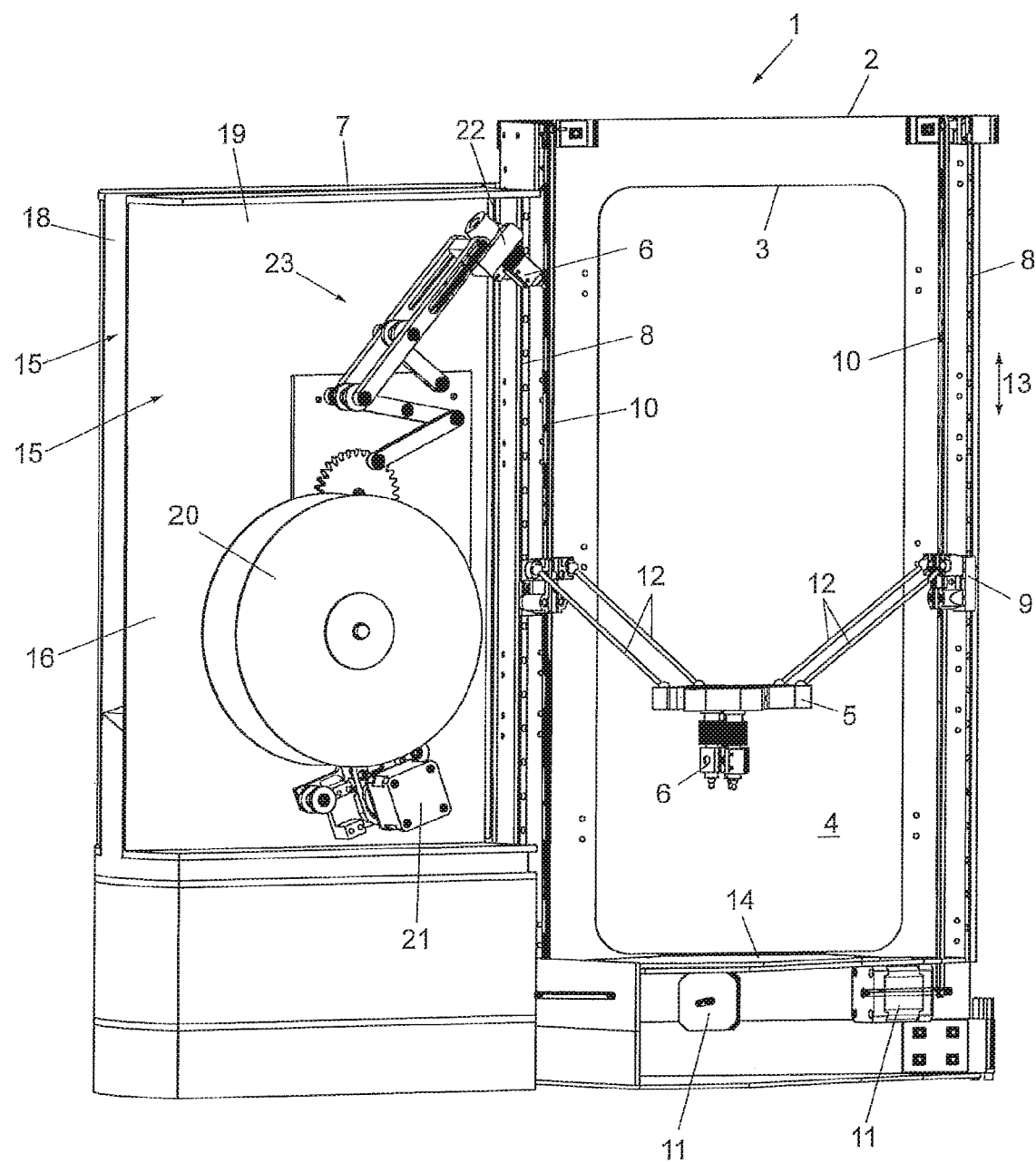
FIG. 4 depicts a second internal view of the 3D printer.

FIG. 4 shows the 3D printer of FIG. 3 in an internal view, depicting a perspective different from that of FIG. 3.

Figure 5:
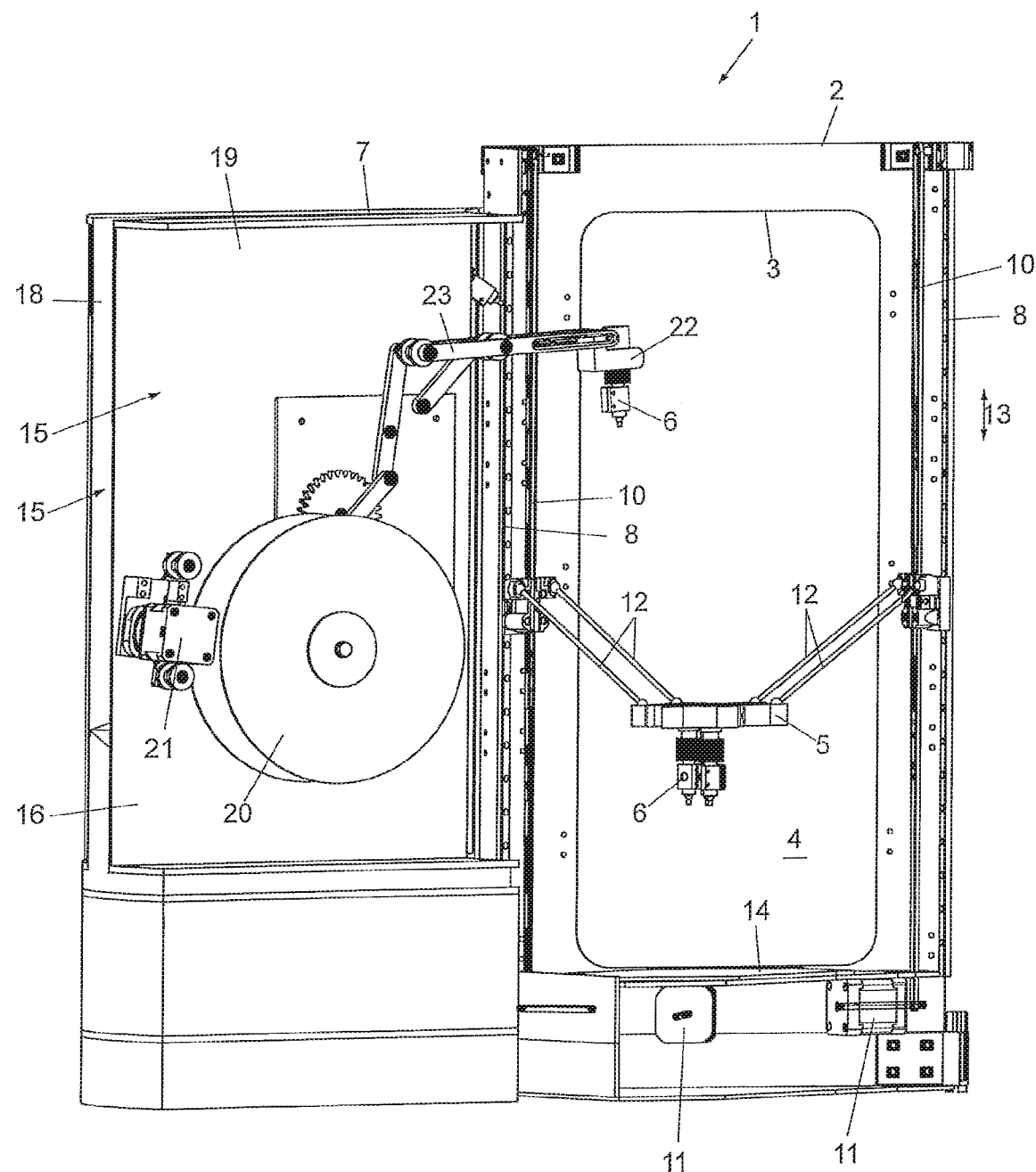
FIG. 5 is a view according to FIG. 4 with the printing head introduced in the printing space.

While the printing head 6 held in the retaining device 22 is located in a storage position, i.e. within the exchangeable insert 16, in FIG. 4, it has been transferred into the transfer position projecting into the construction space 4 in the illustration according to FIG. 5. The transfer is effected by swinging out the arm 23 to which the retaining device 22 is fastened. The transfer position of the printing head 6 depicted in FIG. 5 enables the transfer of the printing head 6 from the retaining device 22 into a printing head mount of the carrier 5. To this end, the carrier 5 can be moved to the printing head 6 held in the retaining device 22 so as to introduce the printing head 6 into the printing head mount of the carrier 5. The retaining device 22 is designed so as to be able to also remove a printing head received in the carrier 5 after completion of the provided manufacturing steps, and move it from the transfer position back into the storage position shown in FIG. 4. The individual components of the exchangeable insert 15 and the mechanics for swinging out the retaining device 22 plus printing head 6 will be explained in more detail below by way of FIGS. 6 to 9.

Figure 6:
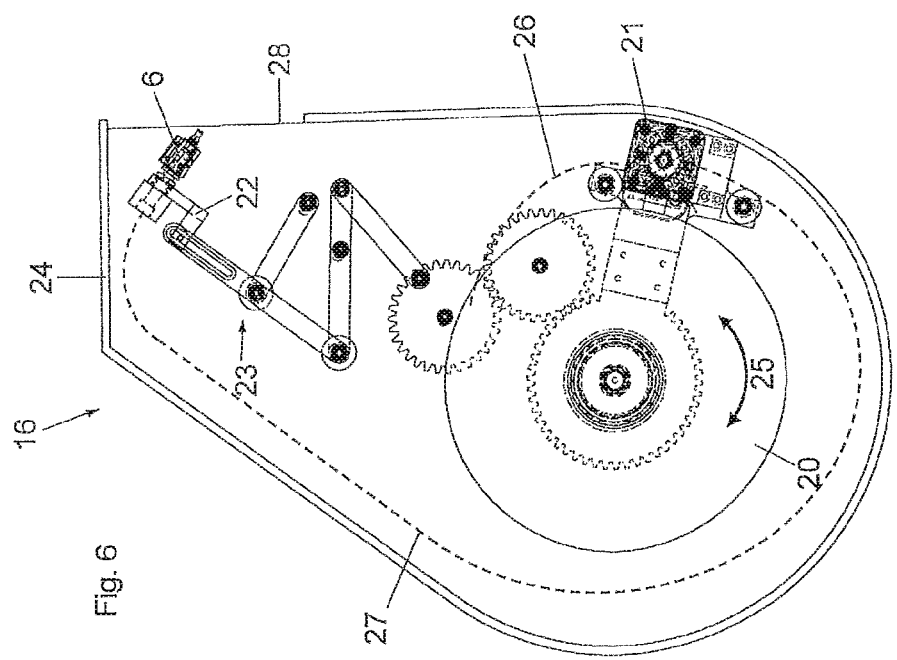
FIG. 6 is a sectional view of the exchangeable insert according to the invention with the printing head in a storage position.

In FIG. 6, the exchangeable insert is again denoted by 16 and comprises a closed housing 24. In the closed housing 24, the roller 20 is rotationally mounted in the sense of double arrow 25. The roller 20 is assigned a feed device 21, to which the filament 26 wound on the roller 20 is supplied. From the feed device 21, a Bowden cable 27 leads to the printing head 6, the filament being guided to the printing head 6 in the interior of the Bowden cable.

The housing 24, in the region of the storage position of the printing head 6 depicted in FIG. 6, comprises an opening 28, through which the printing head 6 can be displaced out of the housing into the construction space 4 of the 3D printer 1. To this end, the arm 23 comprises a first pivot arm 29, which is mounted so as to be pivotable about an axis 30 integral with the housing. A further pivot arm is denoted by 31, which is pivotally fastened to the pivot arm 29 and connected via a joint 32 to an articulated arm 33 that is pivotable about the axis 30 integral with the housing. To the free end of the pivot arm 31 is mounted the retaining device 22 for the printing head 6. The pivot drive for the arm 23 is formed by a first gear 34, which is rotationally mounted about an axis 35 integral with the housing and meshes with a second gear 35 rotationally mounted about an axis 36 integral with the housing. The second gear 35 meshes with a third gear 37, which is rotationally mounted about the axis 38 of the roller 20. One of the gears 34, 35 and 37 is drivingly connected to a rotary drive such as a stepper motor. A rotation of the gears 34, 35 and 37 causes the displacement of the articulated arm 39, which is rotationally fastened to the first gear 34 via a rotary joint 40. This, in turn, causes the pivoting of the pivot arms 29 and 31 from the position illustrated in FIG. 6 into the position illustrated in FIG. 7. At the same time, the feed device 21 connected to the third gear 37 is moved on by an appropriate angle of rotation such that the Bowden cable 27 will not impede the displacement of the printing head 6.

Figure 7:
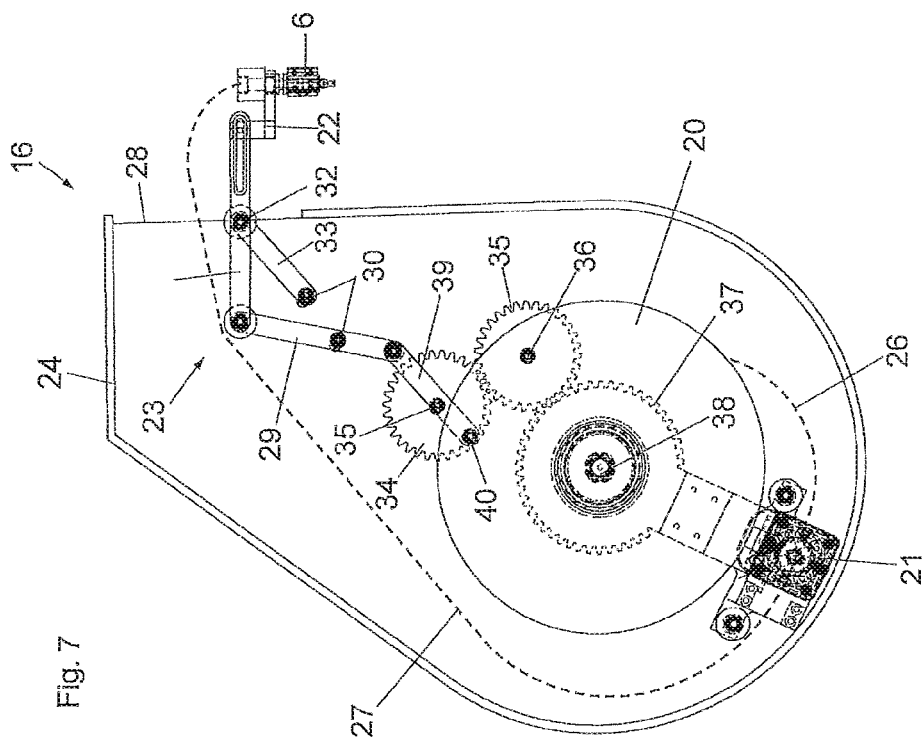
FIG. 7 is a view of the exchangeable insert with the printing head in a transfer position.

From FIG. 8, it is apparent that the printing head 6 was removed from the retaining device 22, out of the transfer position depicted in FIG. 7, and transferred to the carrier 5 (not illustrated).

Further operation of the rotary drive in the same sense of rotation as before causes the arm 23 to be pivoted back into the storage position illustrated in FIG. 9 with the feed device 21 having been moved on in the same sense of rotation in order to release sufficient length of the Bowden cable 27 so as to enable the free positioning of the printing head 6 in the construction space 4.

The return of the printing head 6 into the exchangeable insert 16 takes place in reverse order.

Figure 10:
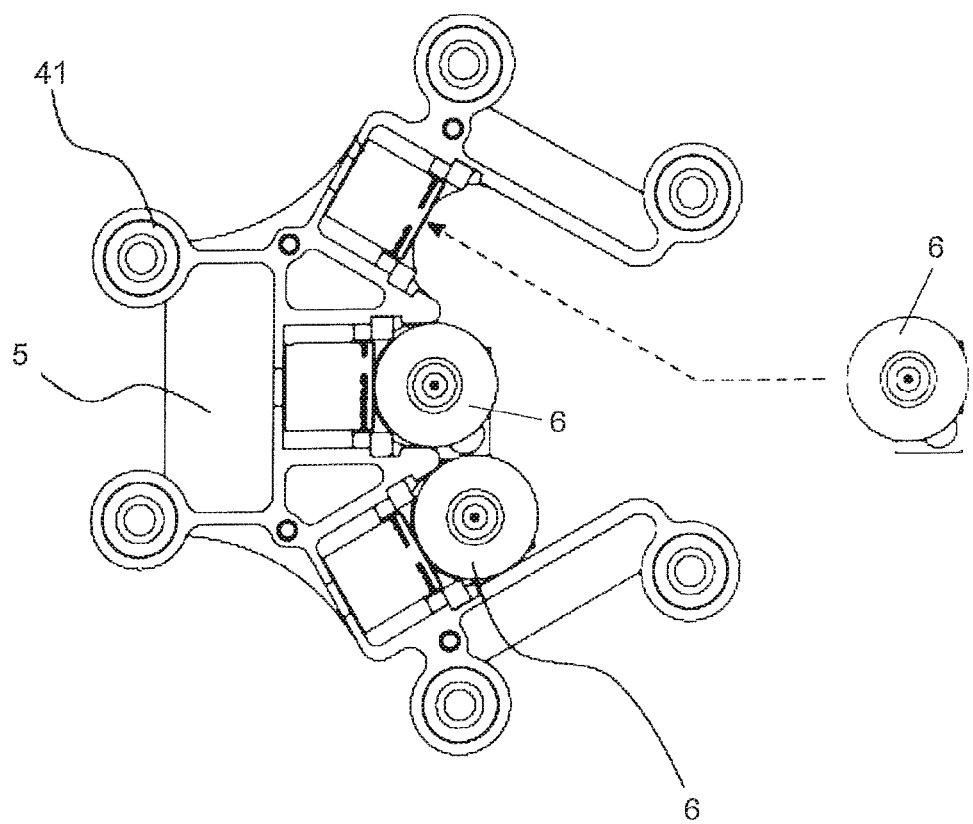
FIG. 10 illustrates the carrier for mounting manufacturing heads.

FIG. 10 depicts the carrier 5 in top view, wherein it is apparent that the carrier 5 comprises a plurality of mounting places for printing heads 6. The joints allowing for an all-around pivoting movement of the stay bars 12 relative to the carrier 5 are denoted by 41.

Figure 11:
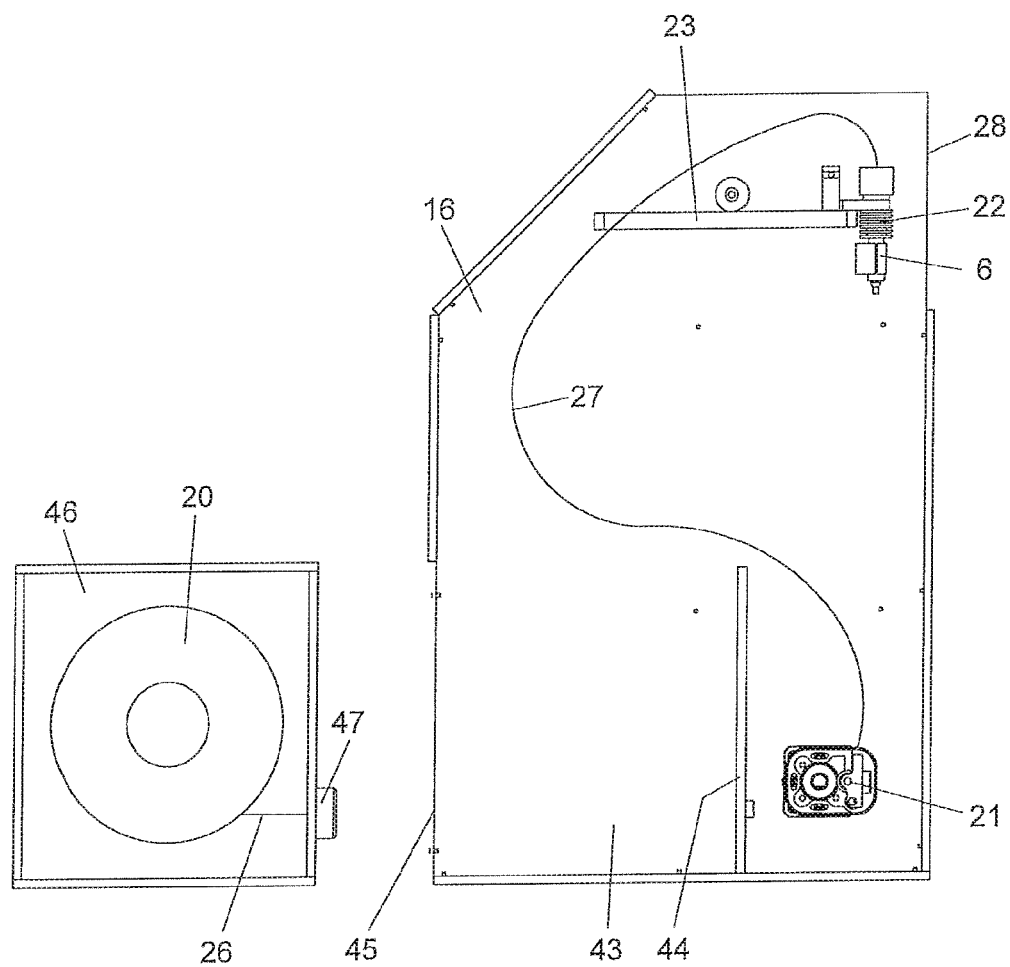
FIG. 11 is a side view of a modified configuration of the exchangeable insert with a mounting place for a material-receiving container.

FIG. 11 depicts a modified configuration of the exchangeable insert 16. The exchangeable insert 16 comprises a feed device 21 arranged to draw the filament coming from a material roller from the latter and feed it to the printing head 6 via the Bowden cable 27. The printing head 6 is held in a retaining device 22 fastened to a movable arm 23. The exchangeable insert 16 comprises a mounting place 43 which, in the present case, is separated from the remaining inner space of the insert 16 by a partition wall 44. The housing 24 comprises an opening 45 through which a separate container 46 can be introduced into the mounting place 43. Said container contains the material roller 20 from which the filament 26 is drawn off and delivered to the feed device 21 through an opening or material duct initially closed by a lid 47.

Figure 12:
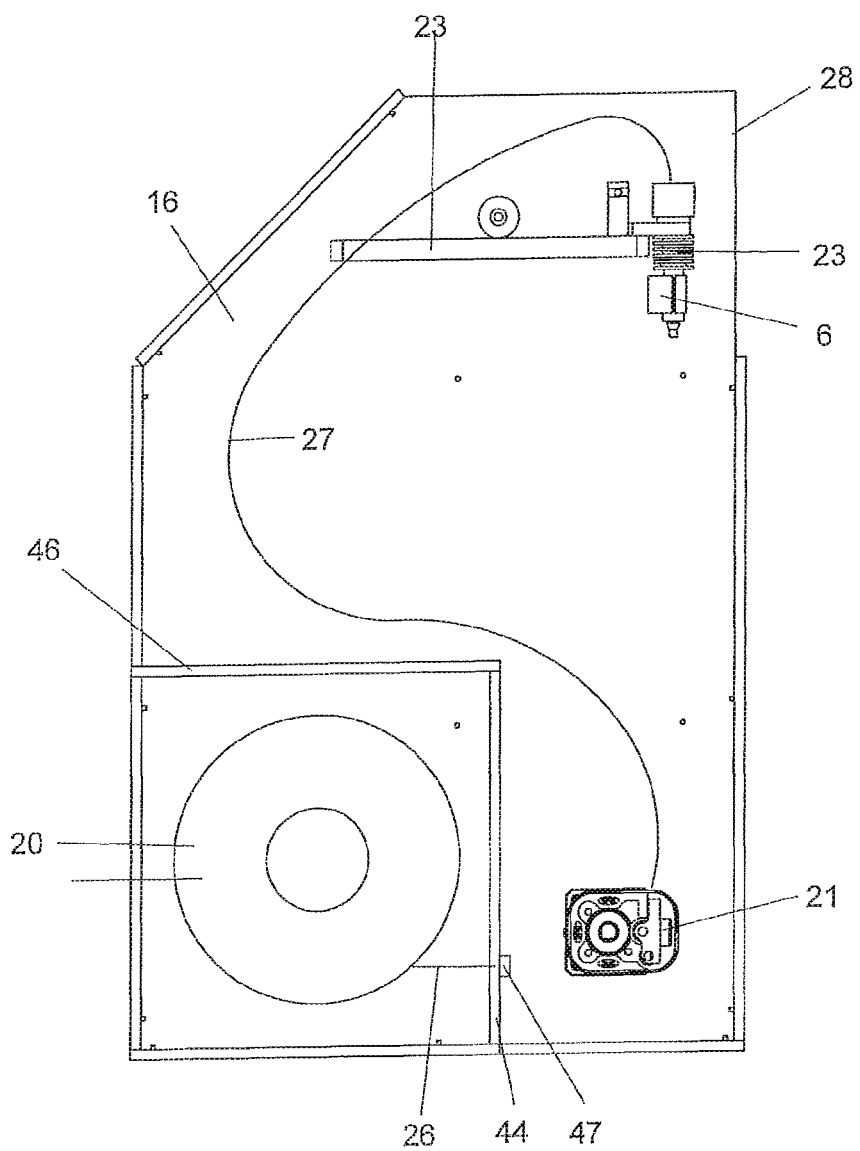
FIG. 12 is a view according to FIG. 11 with the container arranged in the mounting place.
Figure 13:
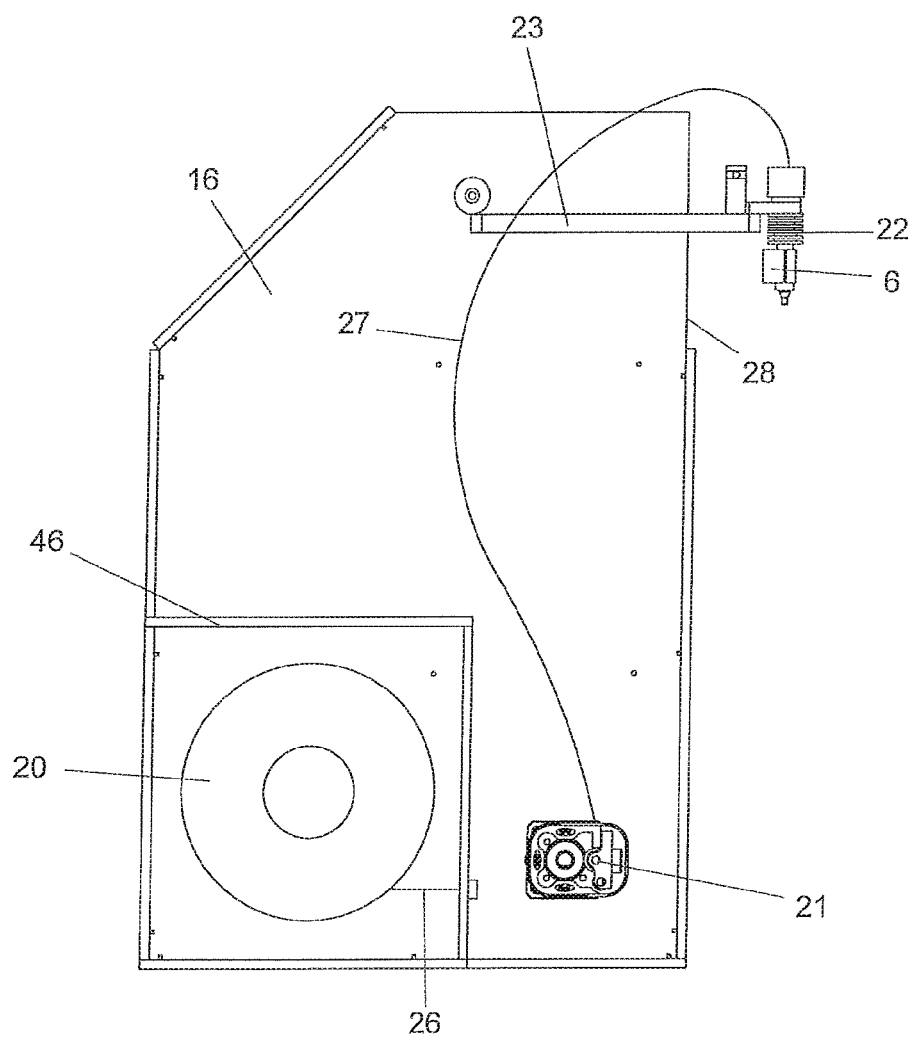
FIG. 13 is a view according to FIG. 12 with the printing head extended from the exchangeable insert.

In FIG. 12, the container 46 is disposed in the mounting space 43. In FIG. 13, the printing head 6 has been displaced out of the housing through the opening 28 into the construction space 4 of the 3D printer 1 by advancing the arm 23.

The invention claimed is:

1. A device for the additive manufacturing of a shaped body, comprising a construction platform; at least one printing head for applying material layer by layer to the construction platform or the shaped body at least partially constructed on the construction platform; a positionable carrier for receipt of the at least one printing head; a positioning system for the positionable carrier; a holder for a material stock; and a supply device configured for supplying material from the material stock holder to the at least one printing head, characterized in that the holder for the material stock, the supply device and the at least one printing head are arranged in a unit designed as an exchangeable insert, and that the exchangeable insert unit is open or openable to a construction space containing the construction platform and the positionable carrier, such that the positionable carrier is configured to receive the at least one printing head upon insertion of the exchangeable insert unit into the device.

2. The device according to claim 1, characterized in that the device comprises at least one mounting or insertion place, each for receiving the exchangeable insert unit.

3. The device according to claim 1, characterized in that the exchangeable insert unit comprises a housing enclosing the holder for the material stock, the supply device and the at least one printing head.

4. The device according to claim 1, characterized in that the exchangeable insert unit comprises a retaining device for detachably holding the at least one printing head.

5. The device according to claim 3, characterized in that at least the at least one printing head is displaceable from a storage position arranged in the housing into a transfer position projecting from the housing into the construction space.

6. The device according to claim 5, characterized in that the exchangeable insert unit comprises an extendable arm and/or swing-out arm, to which the at least one printing head is attached, the at least one printing head being displaceable on said arm from the storage position arranged in the housing into the transfer position projecting from the housing into the construction space.

7. The device according to claim 1, characterized in that a transfer device for transferring the at least one printing head from the exchangeable insert unit into a position received in the carrier, and back, is provided.

8. The device according to claim 1, characterized in that the supply device comprises a feed unit for feeding material stored in strand form or in the form of a filament.

9. The device according to claim 1, characterized in that the supply device comprises a Bowden cable connecting the material stock to the at least one printing head.

10. The device according to claim 5, characterized in that the at least one printing head, in a state connected to the supply device, is displaceable from the storage position arranged in the exchangeable insert unit into the transfer position projecting from the housing into the construction space and/or into the position received in the carrier.

11. The device according to claim 1, characterized in that the holder for the material stock is comprised of a container including a material duct for the material stored in the container, wherein the container is removably arranged in the exchangeable insert unit.

12. The device according to claim 11, characterized in that the container wall of the container is made of a water- and water-vapor-proof material and/or a composite material comprising a cardboard layer and a polymer film.

13. A device for the additive manufacturing of a shaped body, comprising a construction platform, a positionable carrier configured for positioning at least one material application and/or processing head; a positioning system for the positionable carrier; a holder for a material stock; and a supply device configured for supplying material from the material stock holder to the at least one material application and/or processing head, characterized in that the holder for the material stock, the supply device and the at least one material application and/or processing head are arranged in a unit designed as an exchangeable insert; characterized in that at least one mounting or insertion place for mounting an exchangeable unit is provided, wherein the at least one mounting or insertion place is open or openable to the construction space containing the construction platform and the positionable carrier, such that the positionable carrier is configured to receive the at least one material application and/or processing head upon insertion of the exchangeable insert unit into the device.

14. The device according to claim 13, characterized in that a transfer device for transferring the material application and/or processing head from the exchangeable unit received in the at least one mounting or insertion place into a position received in the carrier, and back, is provided.

* * * * *